Aug. 23, 1966     H. B. WHITMORE     3,268,845
RESPIRATION AND MOVEMENT TRANSDUCER
Filed Sept. 21, 1965

INVENTOR
HENRY B. WHITMORE

BY Harry A. Herbert Jr.
   Robert Kern Duncan
                    ATTORNEYS

United States Patent Office 3,268,845
Patented August 23, 1966

3,268,845
RESPIRATION AND MOVEMENT TRANSDUCER
Henry B. Whitmore, Rte. 5, Box 369, San Antonio, Tex.
Filed Sept. 21, 1965, Ser. No. 489,085
1 Claim. (Cl. 338—47)

The invention described herein may be manufactured and used by or for the United States Government for governmental purposes without payment to me of any royalty thereon.

This invention relates to apparatus for detecting subjective responses. More particularly it relates to apparatus for detecting subjective respiration and movement, and still more particularly, to a mechano-electric transducer for converting physical changes in mechanical length to changes in electrical resistance.

It is desirable to be able to measure subjective responses safely and with a minimum of discomfort to the subject. One of the more important subjective responses is that of chest movements. By monitoring chest movements the physical condition of a subject under various conditions of stimuli and stress may readily be determined. It is also desirable that the transducer providing the monitoring signal be relatively unaffected by physical changes other than by the physical change being monitored. For example, when monitoring respiratory movements it is desirable that changes in barometric pressure, or changes in temperature, not affect the signal indicating the respiratory movements.

Previous attempts at using available plethysmographic equipment for detecting respiratory movements have been unsuccessful. In addition to the difficulty of utilizing their very low output impedance, due to their use of mercury in the sensing element, their stability with respect to temperature and barometric changes was very poor. In addition quite frequently under severe conditions of usage the mercury will separate and the transducer become permanently damaged. Also should the transducer rupture, mercury is a toxic element to the body.

It is thus an object of the present invention to provide a transducer for electrically monitoring subjective physical responses.

It is another object of the present invention to provide a mechano-electric transducer for monitoring respiratory movements.

It is another object of the present invention to provide a transducer for measuring movement, that has a sensing element having a high electrical impedance.

It is another object of the present invention to provide a compact, easily worn, transducer for monitoring chest movement.

It is another object of the present invention to provide a transducer for measuring body movements that does not contain chemicals detrimental to body tissue, or that utilizes dangerous voltages or currents.

It is another object of the present invention to provide a respiratory monitoring transducer that may be worn inside a space suit.

It is still another object of the present invention to provide a transducer for monitoring motion that is unaffected by barometric and normal temperature changes.

It is another object of the present invention to provide a mechano-electric transducer that is small, rugged, economical, and easy to construct.

It is another object of the present invention to provide a transducer that will return to normal operation after severe mechanical abuse.

It is another object of the present invention to provide a mechano-electrical transducer that requires a very small amount of mechanical energy to actuate, and has very low electrical power consumption.

It is yet another object of the present invention to provide a mechano-electric transducer that does not have a D.C. magnetic field.

It is another object of the present invention to provide a mechano-electric transducer that is directly compatible with transistorized telemetry circuitry.

It is another object of the present invention to provide a mechano-electric transducer with adjustable impedance and sensitivity.

Additional objects, features and advantages of the present invention will be readily apparent from the following detailed description of certain embodiments thereof when read in conjunction with the accompanying drawings, in which.

Figure 1:
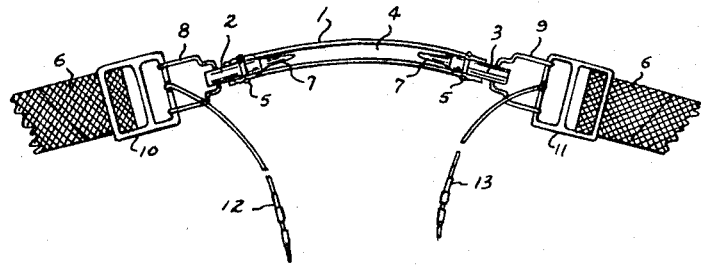
FIG. 1 is a view of one embodiment of the invention.

Referring to FIG. 1 the variable resistance transducer comprises flexible elastic tube member 1, electrodes 2 and 3, and conductive fluid 4. Compression rings 5 seal the elastic tube to the electrodes to prevent loss of the conductive fluid. The flexible but essentially nonelastic strap 6, which may be similar to a conventional web belt, is used to secure the transducer to the body of the subject. For monitoring respiratory movement the flexible tube is placed over the subjects's rib cage and lung cavity and the assembly encircles the girth of the subject. It may be worn next to the body or over suitable garments or undergarments. The electrodes 2 and 3 contact the conductive fluid 4 at their tapered ends 7. Tapering the ends of the electrodes is not necessary but it is advantageous in that it provides a larger fluid to electrode contact area and it also prevents the elastic tube 1 from being subjected to severe shearing or bending stresses at its junction with the electrode. While stainless steel has been found to be a preferred electrode material, the electrodes may be fabricated from brass, copper, silver or other conductive substances. The major requirements in the electrode material are that it does not react chemically with the fluid, that it be reasonably strong, and a fair-to-good conductor of electricity. In the particular embodiment being set forth the electrodes 2 and 3 may swivel in the wire hangers 8 and 9. The hangers also may swivel on the belt end pieces 10 and 11 which may be similar to conventional belt buckles. Electrical leads 12 and 13, soldered to the belt end pieces 10 and 11, connect the transducer to the indicating telemetry, or other monitoring, equipment utilizing the tranducer signal. Since the impedance of the transducer is relatively high, normal typical ranges being between ten thousand and one-hundred thousand ohms, the electrical contact surfaces and conductive elements are not critical as they are with low impedance transducers.

Resilient tube 1 may be fabricated from surgical tubing or other suitable plastic or synthetic material. Neoprene material has been found to have a longer utility life than surgical tubing. However, either are satisfactory materials. Tubes having a length from four to six inches, and an internal diameter of approximately one-eighth inch, have been found to be satisfactory. Generally the impedance of the transducer may be raised by using a longer tube, and the sensitivity may be increased by decreasing the internal diameter of the tube used. However, it is obvious that the length of the fluid column, its cross sectional area and the conductivity of the fluid are all interrelated in determining the nominal impedance of the transducer.

The conductive fluid 4, within the elastic tube 1, functions as a variable resistor. A saline solution of such concentration as to provide about forty thousand ohms of resistance provides a satisfactory variable resistive element. Electrode paste may also be used as the variable resistive element. Neither of these substances is detrimental to body tissue should the transducer be ruptured through accident while in use.

In constructing the transducer care should be exercised to remove all entrapped air from the fluid and to assure that the fluid filled tube, with the electrodes in place, is free of voids. The attachment and seal of the electrodes to the ends of the tube should be air and fluid tight under stresses up to the rupturing point of the tube.

To monitor the respiratory movement of a subject the transducer is positioned over the subject's rib cage, or diaphragm area and the belt 6 is drawn snugly, by adjusting the webbing material 6 through the end pieces 10 and 11, so that a slight amount of tension is present when the subject's lungs are in an exhaled condition. Inhalation by the subject then stretches the elastic tube and the resistance between the leads 12 and 13 increases. Thus both the depth and rate of respiration can be monitored.

The impedance of the transducer is changed as the length of the tube is changed by stretching as the chest cavity is expanded. A small A.C. voltage is impressed across the transducer causing a current to flow through it. It is preferable to use an A.C. voltage instead of a D.C. voltage to prevent electrolysis of the saline solution and to prevent the formation of steady state magnetic fields about the transducer and leads. Voltages of from three to ten volts R.M.S. have proved very satisfactory. Sixty cycle current may be used to energize the transducer. In one operating embodiment 1700 cycle carrier frequency was used to energize the transducer and the output from the transducer modulated the frequency modulated telemetry oscillator. At relatively low frequencies the impedance of the transducer is mainly resistive; at higher frequencies the capacitive reactance may become appreciable and should be taken into consideration. In the use of another embodiment it was desirable to have a D.C. indication of respiratory motion. In that instance a conventional diode and associated circuitry were used to rectify the A.C. signal output taken from across the transducer.

To understand the operation of the transducer in providing a variable impedance as a function of its length several factors have to be comprehended. One factor is that as relatively thin-wall small-diameter tubing (that is tubing where the ratio of length to cross-section is quite large) is stretched, the diameter decreases as the tube is stretched. In fact, the decrease in internal diameter with stretching occurs at such a rate as to tend to decrease the volume contained by the tube. Another factor is that the fluid is essentially noncompressible. Thus, the volume occupied by the fluid remains constant as the tube is stretched, and, coupled with the foregoing factor, it may be seen that the tube will always operate completely filled without voids. Another factor is that due to the inherent elasticity of the tube it supplies its own restoring force as tension is relieved from it. And, a most important factor is the fundamental relationship of the resistance of a conductive substance to its length and cross-sectional area, which is expressed;

$$R = K\frac{L}{A}$$

where $R$ = resistance
$K$ = conductivity constant
$L$ = length of the conductor, and
$A$ = the cross-sectional area of the conductor In the subject transducer it has been shown that the volume remains constant. Thus, the product of length times cross-sectional area remains constant. It is now evident that the resistance of the transducer will vary as a function in accord with the square of the length. This provides a transducer that is effectively six db more sensitive than conventional linear displacement types of transducers.

Figure 2:
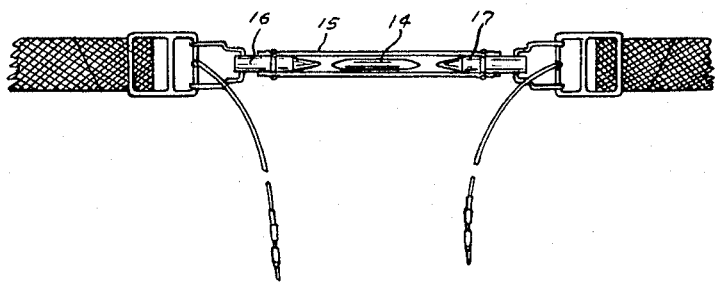
FIG. 2 is a view of an embodiment of a modification of the invention having higher sensitivity and impedance.

The sensitivity of the transducer may be further improved by placing a restrictor within the tube as shown in FIG. 2. Restrictor 14 is fabricated from a nonconductive rod such as acrylic plastic. The diameter of the restrictor is made slightly smaller than the inside diameter of tube 15. For maximum sensitivity it is desirable to make the restrictor of such a diameter that the fluid space between the tube 15 and the restrictor 14 is almost diminished to zero when the tube is extended (stretched) to its normal maximum operating length. Further stretching of the tube will cause a "sealed off" condition to momentarily exist while the tube is so extended and the transducer will be inoperative as to further extending motion, however, the indication of a severe extension will be provided by an extremely high impedance indication. Upon relaxing of the tension on the tube, by the return of normal mechanical (physical) operation of the subject, the transducer will return to normal electrical operation. As in the previously described embodiment of this invention, it is desirable in embodiments utilizing a restrictor that the remaining volume of the tube be completely filled with the conductive fluid.

The restrictor 14 may effectively "float" between the electrodes 16 and 17. It is not necessary that it be centered; operation of the transducer will not be impaired if the restrictor is in contact with an electrode. The length of the restrictor is not critical. In an operating embodiment having a total unstretched tube length of approximately four inches, a one-inch long restrictor has been found to be very satisfactory. This leaves a length of approximately one-half inch on each side of the restrictor between the restrictor end and the electrode ends when the restrictor is in a centered position. With the tube lengths of from four to six inches, bending of the tube when placed over the chest of human subjects will be negligible. In a particular operating embodiment the tube has a one-eighth inch inside diameter, the restrictor has a diameter of approximately seven sixty-fourths of an inch, and the fluid is a saturated saline solution. The nominal impedance (resistive) is approximately forty-thousand ohms when positioned on the subject, and the resistive change with respiration of the subject is approximately forty percent. A similar transducer without a restrictor provided approximately twenty percent changes in resistance during normal respiration.

Transducers, as set forth herein, have shown no change in impedance when subjected to barometric changes from sea level to altitudes of above 60,000 feet, nor any changes in impedance from room temperature to body temperatures. Normally the transducer is worn next to, or closely adjacent, the body of the subject. Hence, it operates at body temperature or slightly cooler temperatures. Thus, it has been found that no calibration changes are necessary to correct for barometric or temperature changes.

It will be understood that while the use of the invention has only been described in detail as it is applied to monitoring respiration movements, it may also be used for monitoring many other subjective movements, or used to indicate position such as where one end of the transducer is fixed to a reference location and the other end attached to a portion of the subject's anatomy that may move with respect to the fixed location. For instance if one end of the transducer is attached to the forearm just above the wrist and the other end attached to the back of the hand, the flexing of the wrist may be monitored. Objective measuring (after calibrating) or monitoring may also be made with the transducer.

It will also be understood that various changes in the details, materials, and arrangements of the parts, which have been herein described and illustrated in order to explain the nature of the invention may be made by those skilled in the art within the principle and scope of the invention as expressed in the appended claim.

What is claimed is:

A variable resistive respiration and subjective movement transducer comprising: an elastic tube having a length-to-internal diameter ratio of at least 20 to 1; a tapered electrode means positioned in a sealing relationship with the said tube at each end of the said tube; a restrictor of electrical insulation material, positioned in movable relationship within the said tube between the said electrodes, the said restrictor being smaller in diameter than the inside diameter of the tube and shorter than the space between the said electrodes; a saline solution conductive fluid contacting the said electrodes, essentially surrounding the said restrictor, completely filling the remaining volume of the said tube; connecting means for making electrical connection to the said electrodes; and means for positioning the said tube in relation to the subject whereby the tube extends and contracts with the movement of the subject.

References Cited by the Examiner

UNITED STATES PATENTS

| | | | |
|---|---|---|---|
| 1,693,734 | 12/1928 | Waggoner | 128—2.06 |
| 2,199,408 | 5/1940 | Liberte | 128—2.05 |
| 2,367,465 | 1/1945 | Kunzer | 338—44 |
| 2,517,553 | 8/1950 | Fowler | 338—36 X |
| 2,518,906 | 8/1950 | Kocmich | 338—2 X |
| 2,735,949 | 2/1956 | Podolsky | 128—2.05 X |
| 2,837,082 | 6/1958 | Elliott et al. | 128—2.06 |
| 2,848,992 | 8/1958 | Pigeon | 128—2.05 |
| 2,854,968 | 10/1958 | Wright | 128—2.05 |
| 3,090,377 | 5/1963 | Salisbury et al. | 128—2.05 |

RICHARD M. WOOD, *Primary Examiner.*

W. D. BROOKS, *Assistant Examiner.*